(12) United States Patent
Esken et al.

(10) Patent No.: US 9,043,959 B2
(45) Date of Patent: Jun. 2, 2015

(54) COMBINE HARVESTER WITH TRANSVERSE FEED DRUM

(71) Applicant: CLAAS SELBSTFAHRENDE ERNTEMASCHINE GMBH, Harsewinkel (DE)

(72) Inventors: Dirk Esken, Soest-Meckingsen (DE); Bernd Holtmann, Sensenhorst (DE); Martin Niermann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 81 days.

(21) Appl. No.: 13/920,663

(22) Filed: Jun. 18, 2013

(65) Prior Publication Data
US 2014/0011554 A1    Jan. 9, 2014

(30) Foreign Application Priority Data
Jul. 3, 2012    (DE) .......................... 10 2012 105 880

(51) Int. Cl.
*A01F 12/39* (2006.01)
*A01F 12/10* (2006.01)
(52) U.S. Cl.
CPC ................. *A01F 12/39* (2013.01); *A01F 12/10* (2013.01)

(58) Field of Classification Search
USPC .............................. 460/63, 68–70, 73, 75, 76
See application file for complete search history.

(56) References Cited

U.S. PATENT DOCUMENTS

| 3,794,047 | A | * | 2/1974 | De Coene et al. | ............... 460/66 |
| 4,170,235 | A | * | 10/1979 | Ashton et al. | ................... 460/16 |
| 4,653,515 | A | * | 3/1987 | Tophinke | ......................... 460/78 |
| 4,976,654 | A | * | 12/1990 | Dammann et al. | .............. 460/80 |
| 5,186,683 | A | * | 2/1993 | Farley et al. | ................... 460/105 |
| 7,311,594 | B2 | * | 12/2007 | Esken et al. | .................... 460/59 |
| 8,556,690 | B2 | * | 10/2013 | Bojsen et al. | ................... 460/70 |

FOREIGN PATENT DOCUMENTS

WO    2010/086063    8/2010

* cited by examiner

*Primary Examiner* — Alicia Torres
(74) *Attorney, Agent, or Firm* — Michael J. Striker

(57) ABSTRACT

A combine harvester includes a separating device that extends in a longitudinal direction of the combine harvester. In front of the separating device, a tangentially disposed feed drum is installed. The feed drum is configured with substantially axially parallel guide plates on a circumference thereof. The substantially axially parallel guide plates bear against the jacket surface of the feed drum via support elements. The support elements extend between adjacent guide plates in the circumferential direction and, extend between the adjacent guide plates in the radial direction across an entire free jacket surface of the feed drum.

6 Claims, 3 Drawing Sheets

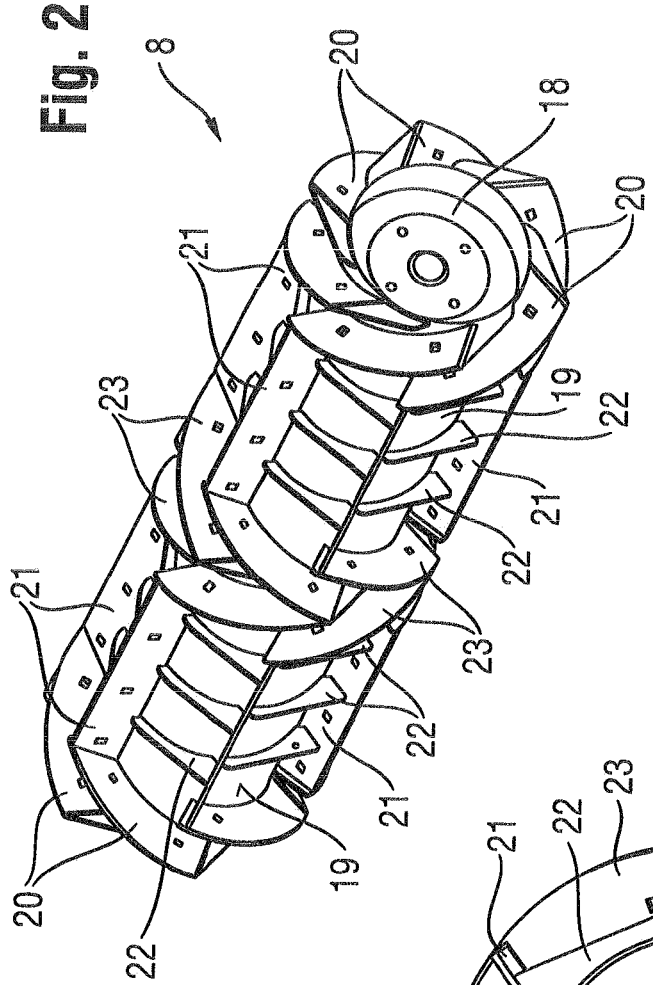
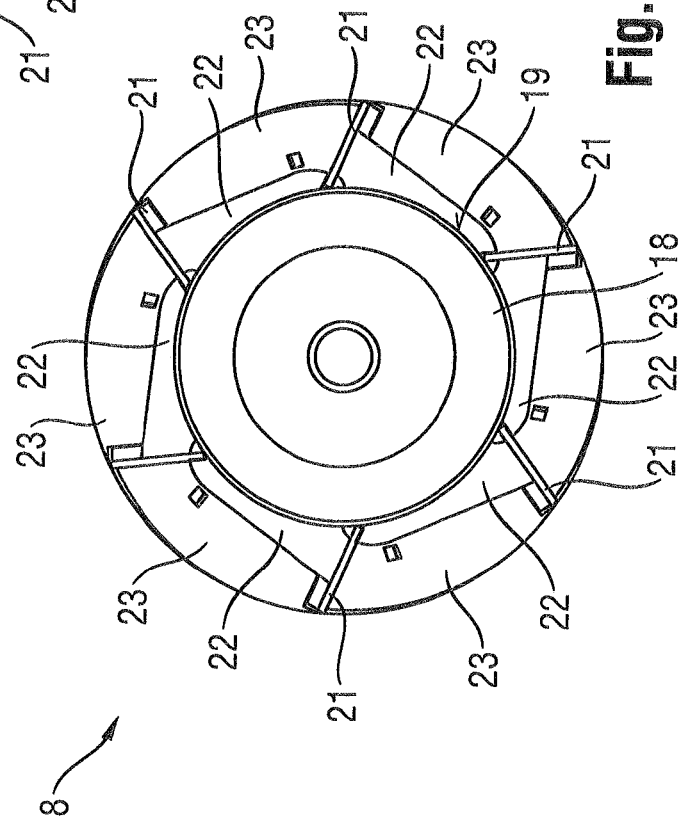

COMBINE HARVESTER WITH TRANSVERSE FEED DRUM

CROSS-REFERENCE TO A RELATED APPLICATION

The invention described and claimed hereinbelow is also described in German Patent Application DE 10 2012 105880.6, filed on Jul. 3, 2012. This German Patent Application, subject matter of which is incorporated herein by reference, provides the basis for a claim of priority of invention under 35 U.S.C. 119(a)-(d).

BACKGROUND OF THE INVENTION

The invention relates to combine harvesters, which are known. Document WO 2010/086063 A1, for example, describes a known combine harvester with an axial separating device having two separating rotors that extend in the longitudinal direction of the combine harvester. The separating device is mounted in front of a threshing unit, which extends transversely relative to the separating device, and a feed drum, which channels the crop stream output by the threshing unit to be fed to the axial separating device. The feed drum comprises guide plates disposed in an axially parallel manner on the jacket surface thereof. The guide plates are used to convey the crop stream. On the side that does not directly convey the crop stream; the guide plates comprise support elements. The support elements extend in sections in the circumferential direction of the jacket surface, absorb the forces acting on the guide plates as the crop stream is conveyed, and bear against the jacket surface. The support elements are connected to the guide plates and the jacket surface by means of welds.

A disadvantage of this arrangement is that, due to the dynamically changing loads generated by minor fluctuations in the crop stream during conveyance of the crop stream from the threshing unit to the axial separating device, cracks form in the region of the weld seams. Also, the support elements press via the ends thereof facing away from the particular guide plate into the jacket surface of inc feed drum. This damage is caused in that the forces absorbed by the support elements are introduced into the jacket surface at the free ends of the support elements at an acute angle in accordance with the wedge-shaped geometry thereof. Damage of this type makes it necessary to replace the damaged feed drum in order to ensure a reliable flow of material. Moreover, such damage at the feed drum can result in the support elements becoming detached from the feed drum and reaching the interior of the combine harvester. This can result in damaging working assemblies disposed downstream of the feed drum.

SUMMARY OF THE INVENTION

The present invention overcomes the shortcomings of known arts, such as those mentioned above.

The present invention provides a combine harvester with a separating device that extends in the longitudinal direction of the combine harvester, in front of which a tangentially disposed feed drum is installed. The feed drum has, on the circumference thereof, substantially axially parallel guide plates that bear against a jacket surface of the feed drum via support elements. The support elements extend between adjacent guide plates in the circumferential direction, and in particular, the support elements extend between the adjacent guide plates in the radial direction across the entire free jacket surface of the feed drum.

Given that the support elements extend across the free jacket surface from guide plate to guide plate, the forces are introduced substantially tangentially into the jacket surface and the forces bear thereon in the circumferential direction. As a result, the dynamically changing loads that act on the guide plates as the crop stream is conveyed are better captured, thereby preventing damage.

As compared to increasing the jacket thickness of the main body of the feed drum, this solution has advantages in terms of the weight of the feed drum and the material costs.

Preferably, the radial extension of the support elements decreases in the circumferential direction of the feed drum starting from the side of a guide plate that is not used to directly convey the crop stream. This construction ensures that the crop stream between the adjacent guide plates approaches the jacket surface in order to come into contact with and not be conveyed past the jacket surface.

Furthermore, the top edge of the support elements facing away from the jacket surface have a substantially tangential profile. The result thereof is an enhanced effect of the forces absorbed by the support elements bearing in the circumferential direction of the feed drum. In contrast to the prior art, the forces that are absorbed by the support element are introduced into the jacket surface at a substantially obtuse angle. This means that the portion of the horizontal components of the resultant forces acting in the circumferential direction is greater than the portion of the horizontal components acting on the jacket surface in the radial direction.

Advantageously, the support elements are disposed in alignment in the circumferential direction of the feed drum. The annular configuration results in better absorption of the forces absorbed by the support elements in the circumferential direction. The support elements, therefore, bear not only against the subsequent guide plate, but additionally against the support element adjacent thereto.

In an embodiment, at least one support element is disposed between the adjacent guide plates. The number of support plates that are disposed between two adjacent guide plates depends on the anticipated load or dimensions of the feed drum.

Preferably, the separating device of the combine harvester is designed as an axial separating device having at least one separating rotor.

Furthermore, the separating device of the combine harvester also may be designed as a tray-type shaker.

BRIEF DESCRIPTION OF THE DRAWINGS

Further features and advantages of the invention will become apparent from the description of embodiments that follows, with reference to the attached figures, wherein:

FIG. 2 shows a perspective view of a feed drum;

FIG. 3 shows a side view of the feed drum according to FIG. 2; and

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
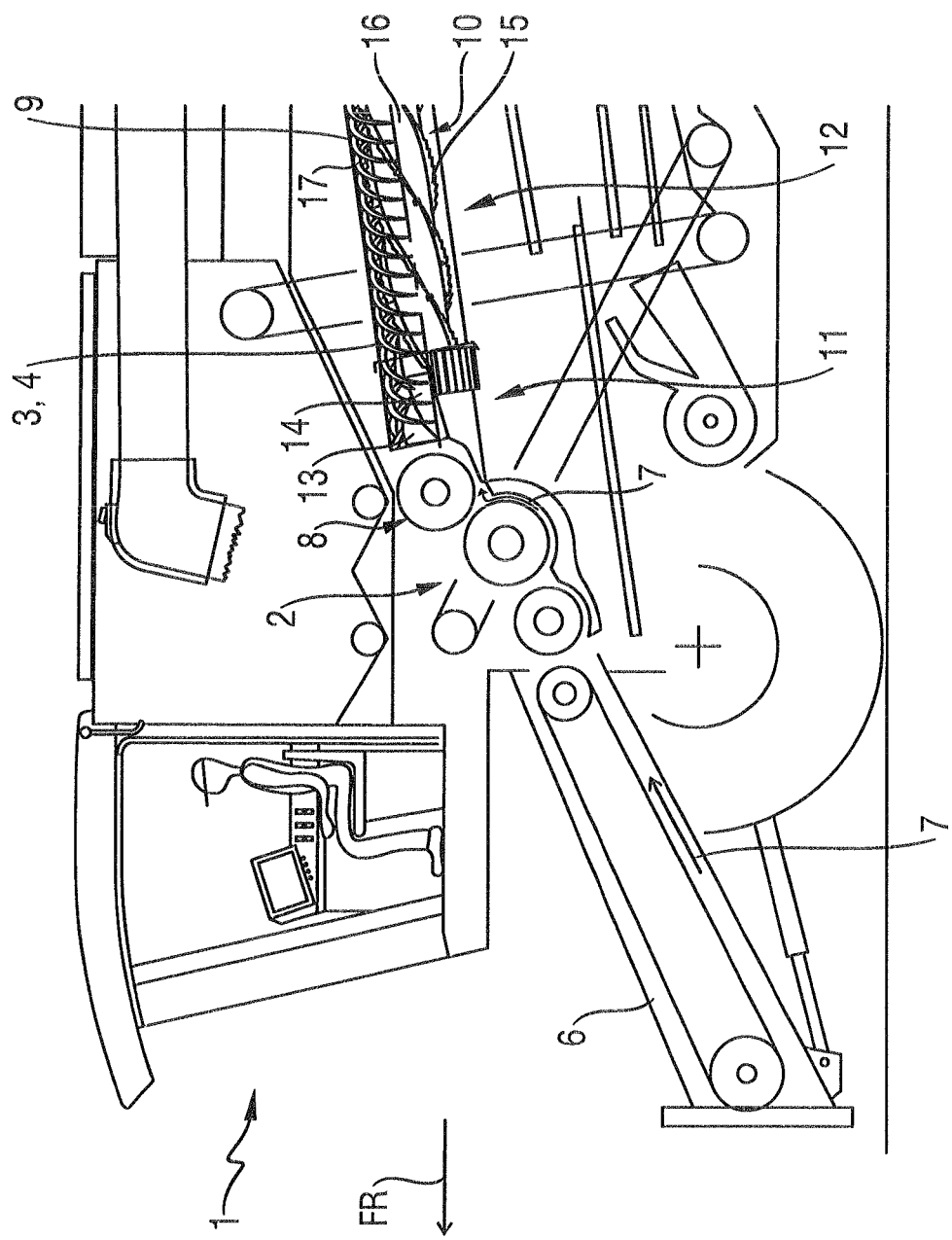
FIG. 1 presents a schematic depiction of a combine harvester.

FIG. 1 presents an exemplary embodiment of a self-propelled combine harvester 1. The inventive combine harvester 1 is equipped with a tangential threshing mechanism 2 and an axial separating device 3 (for example, as a separating device 4) that is disposed downstream of the tangential threshing mechanism 2.

In greater detail, a crop stream is taken up by a header (not shown), which conveys the crop stream to a feed rake 6. The feed rake 6 transfers the crop stream to the tangential threshing mechanism 2, which mechanically processes the crop stream. From the tangential threshing mechanism 2, a crop stream 7 (formed substantially of threshed-out stalks) is conveyed via a feed drum 8 into the axial separating device 3. The axial separating device 3 comprises two rotor housings 9, which are formed in regions as a sieve or perforated surface and are located in parallel one behind the other in the direction of travel FR of the combine harvester 1. A separating rotor 10 is driven in a rotating manner and is located in each rotor housing. The axial separator 4 has an intake region 11 and a downstream separating region 12.

In an intake region 11, each separating rotor 10 is designed as a truncated cone equipped with conveyor auger sections 13. In the separating region 12, each separating rotor 10 is designed as a cylindrical core pipe 16 equipped with conveyor elements 15, for example, wherein the large diameter of the truncated cone 14 corresponds to the diameter of the core pipe 16. Via interaction with guide rails 17 installed in the interior of the separating region 12 in the rotor housing 9, the conveyor elements 15 transport the crop stream 7 into the rear region of the combine harvester 1. In the rear region, the grains remaining in the crop stream 7 and, any broken straw and chaff are separated and removed.

A perspective view of the feed drum 8 is depicted in FIG. 2. The feed drum 8 comprises a hollow cylindrical main body 18 having a circular cross section. The main body 18 has a jacket surface 19, which is continuous at least in the radial direction. Crop-stream guide elements 20 extending in the radial direction are disposed on the respective outer sides of the feed drum 8, are sloped inwardly and point toward the center of the feed drum 8. The crop-stream guide elements 20 inwardly divert the crop stream output by the tangential threshing mechanism 2. Further crop-stream guide elements 20, which slope outwardly, are disposed in pairs in the center of the feed drum 8.

The crop-stream guide elements 23 located in the center of the feed drum 8 are arranged substantially in a wedge shape in order to distribute the crop stream in this region and thereby ensure uniform output to the axial separating device 3. The design of the feed drum 8 is symmetrical on both sides of the central crop-stream guide elements 23. Guide plates 21, which are arranged axially parallel to the longitudinal axis of the feed drum 8, are located between the crop-stream guide elements 23,20 disposed on the inner side and on the outer side. The guide plates 21 extend outwardly in the radial direction and slope slightly in the circumferential direction of the feed drum 8. A plurality of guide plates 21 is evenly distributed around the circumference of the feed drum 8. One or more support elements 22 are disposed between adjacent guide plates 21 in each case and are connected to the guide plates 21 via a weld. One particular support element 22 extends in the circumferential direction across the entire free jacket surface 19 between the adjacent guide plates 21.

FIG. 3 depicts a side view of the feed drum 8. Please note the end-face crop-flow guide elements 20 on a side according to FIG. 2 are not shown in the FIG. 3 depiction. Starting from the rear side of the guide plate 21, which does not convey the crop stream directly, the support elements 22 extend in the circumferential direction of the feed drum 8 to the front side of the subsequent guide plate 21, which conveys the crop stream directly. The radial extension of the support elements 21 decreases in the circumferential direction starting from the rear side of the guide plate 21 until reaching the subsequent guide plate 21. The top edge of the support elements 22 facing away from the jacket surface 19 has a substantially tangential profile.

As shown in FIGS. 2 and 3, the support elements 22 are aligned in the circumferential direction of the feed drum 8. The result is a substantially annular arrangement of the support elements 22, which is advantageous for dissipating the forces that are absorbed. Alternatively, the aforementioned support elements also can be offset with respect to one another in the axial direction of the feed drum 8. FIG. 2 depicts a plurality of support elements 22 is disposed between two adjacent guide plates 21. Depending on the anticipated load on the feed drum 8, the number of support elements 22 between two guide plates 21 and in the circumferential direction can vary. However, at least one support element 22 is disposed between two adjacent guide plates 21.

Figure 4:
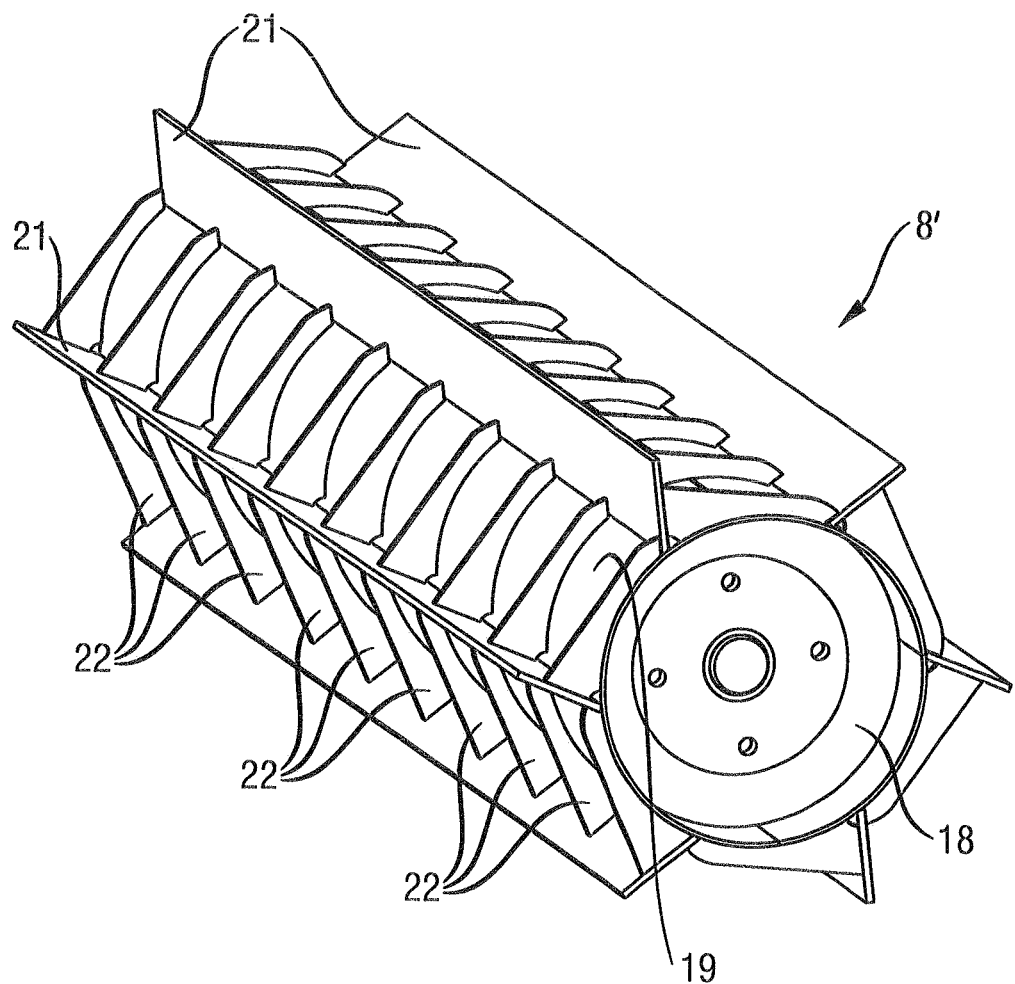
FIG. 4 shows a perspective view of a second embodiment of a feed drum according to the invention.

FIG. 4 depicts an embodiment of a feed drum 8' (which is also provided on a combine harvester), wherein the separating device 3 thereof is designed as a tray-type shaker having a plurality of shaker steps, in front of which the feed drum 8' is installed, as a so-called impeller. The feed drum 8' differs from that of a combine harvester having an axial separating device substantially in that feed drum 8' does not comprise crop-stream guide elements disposed on the end faces or in the center. For the rest, the design of the feed drum 8' largely corresponds to that of the feed drum 8 of a Combine harvester 1 having an axial separating device 4. The same reference signs were used for the components in FIG. 4 that are identical to the components of the feed drum 8 according to FIGS. 2 and 3.

REFERENCE CHARACTERS 1 combine harvester
2 tangential threshing mechanism
3 axial separating device
4 separating device
6 feed rake
7 crop stream
8 feed drum
8' feed drum
9 rotor housing
10 separating rotor
11 intake region
12 separating region
13 conveyor auger section
14 truncated cone
15 conveyor elements
16 core pipe
17 guide rail
FR direction of travel
18 main body
19 jacket surface
20 outer crop-stream guide element
21 guide plate 22 support element
23 inner crop-stream guide element As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester (1) comprising:
    a separating device (3) that extends in a longitudinal direction of the combine harvester (1), and
    a tangentially disposed feed drum (8, 8') installed in front of the separating device (3) and configured with substantially axially parallel guide plates (21) on a circumference thereof,
    wherein the substantially axially parallel guide plates (21) bear against a jacket surface (19) of the feed drum (8, 8') via support elements (22),
    wherein the support elements (22) extend between adjacent guide plates (21) in a circumferential direction from a rear side of a guide plate to a front side of an adjacent guide plate,
    wherein the support elements (22) extend between the adjacent guide plates (21) in the radial direction across the jacket surface (19) of the feed drum (8, 8'); and
    wherein the radial extension of the support element (22) decreases in the circumferential direction of the feed drum (8, 8') starting from the rear side of the guide plate (21) which, which is not used to directly convey the crop stream.

2. The combine harvester (1) according to claim 1, wherein the top edge of the support element (22) facing away from the jacket surface (19) has a substantially tangential profile.

3. The combine harvester (1) according to claim 1, wherein the support elements (22) are aligned in the circumferential direction of the feed drum (8, 8').

4. The combine harvester (1) according to claim 1, wherein at least one support element (22) is disposed between the adjacent guide plates (21).

5. The combine harvester according to claim 1, wherein the separating device (3) is an axial separating device having at least one separating rotor (10).

6. The combine harvester according to claim 1, wherein the separating device (3) is designed as a tray-type shaker.

\* \* \* \* \*